United States Patent
Fan et al.

(10) Patent No.: US 9,057,608 B2
(45) Date of Patent: Jun. 16, 2015

(54) SIMPLE TYPE DUAL AXES OPTOELECTRONIC LEVEL

(71) Applicant: 3DFAMILY TECHNOLOGY CO., LTD., New Taipei (TW)

(72) Inventors: Kuang-Chao Fan, Taipei (TW); Chih-Chin Hsu, Taipei (TW)

(73) Assignee: 3DFAMILY TECHNOLOGY CO., LTD., New Taipei (TW)

( * ) Notice: Subject to any disclaimer, the term of this patent is extended or adjusted under 35 U.S.C. 154(b) by 240 days.

(21) Appl. No.: 13/848,218

(22) Filed: Mar. 21, 2013

(65) Prior Publication Data

US 2014/0053421 A1 Feb. 27, 2014

(30) Foreign Application Priority Data

Aug. 27, 2012 (TW) .............................. 101131032 A

(51) Int. Cl.
*G01C 9/06* (2006.01)
*G01C 15/10* (2006.01)
*G01C 9/20* (2006.01)

(52) U.S. Cl.
CPC .. *G01C 9/20* (2013.01); *G01C 9/06* (2013.01); *G01C 2009/066* (2013.01)

(58) Field of Classification Search
CPC ....... G01C 9/06; G01C 2009/066; G01C 9/20
USPC ......................................... 33/366.16, 366.23
See application file for complete search history.

(56) References Cited

U.S. PATENT DOCUMENTS

| 2,427,902 A * | 9/1947 | Clifton et al. ................. 250/215 |
| 2,707,898 A * | 5/1955 | Horsfall, Jr. .................. 356/249 |
| 4,332,090 A * | 6/1982 | Bailey et al. ............... 33/366.12 |
| 4,827,624 A | 5/1989 | Franklin et al. |
| 4,932,132 A | 6/1990 | Baker et al. |
| 5,027,522 A | 7/1991 | Cagan et al. |
| 5,313,713 A | 5/1994 | Heger et al. |
| 6,526,668 B1 | 3/2003 | Beckhart et al. |
| 7,497,021 B2 * | 3/2009 | Perchak et al. ............ 33/366.16 |
| 7,964,806 B2 * | 6/2011 | Freydank et al. .......... 177/25.13 |
| 2010/0031522 A1 * | 2/2010 | Ammann .................... 33/366.16 |

FOREIGN PATENT DOCUMENTS

CN 200941654 8/2007

(Continued)

*Primary Examiner* — Laura Martin
*Assistant Examiner* — Rhyan C Lange
(74) *Attorney, Agent, or Firm* — Huffman Law Group, PC

(57) ABSTRACT

A simple type dual axes optoelectronic level includes a carrier, an adjustable fixing mechanism, a level sensing device, a container cup holding a liquid, and a reflector. The adjustable fixing mechanism and the container cup are fixed at the carrier. The level sensing device is fixed at the adjustable fixing mechanism and faces the container cup. The reflector is fixed at the bottom surface of the container cup. The level sensing device provides a measuring light beam, which is refracted by the liquid surface to the reflector, and reflected back to the liquid surface by the reflector, and refracted again by the liquid surface to the level sensing device. Through the refraction effect, the level sensing device can detect two angles between the bottom surface of the carrier and the liquid surface. The dual axes optoelectronic level has advantages of simple structure, low cost and differentiating angles of two axes.

9 Claims, 9 Drawing Sheets

(56) References Cited

FOREIGN PATENT DOCUMENTS

| RU | 2431808 C1 * | 10/2011 |
| TW | 201024687 | 7/2010 |
| TW | 201111763 | 4/2011 |
| TW | M402416 | 4/2011 |

* cited by examiner

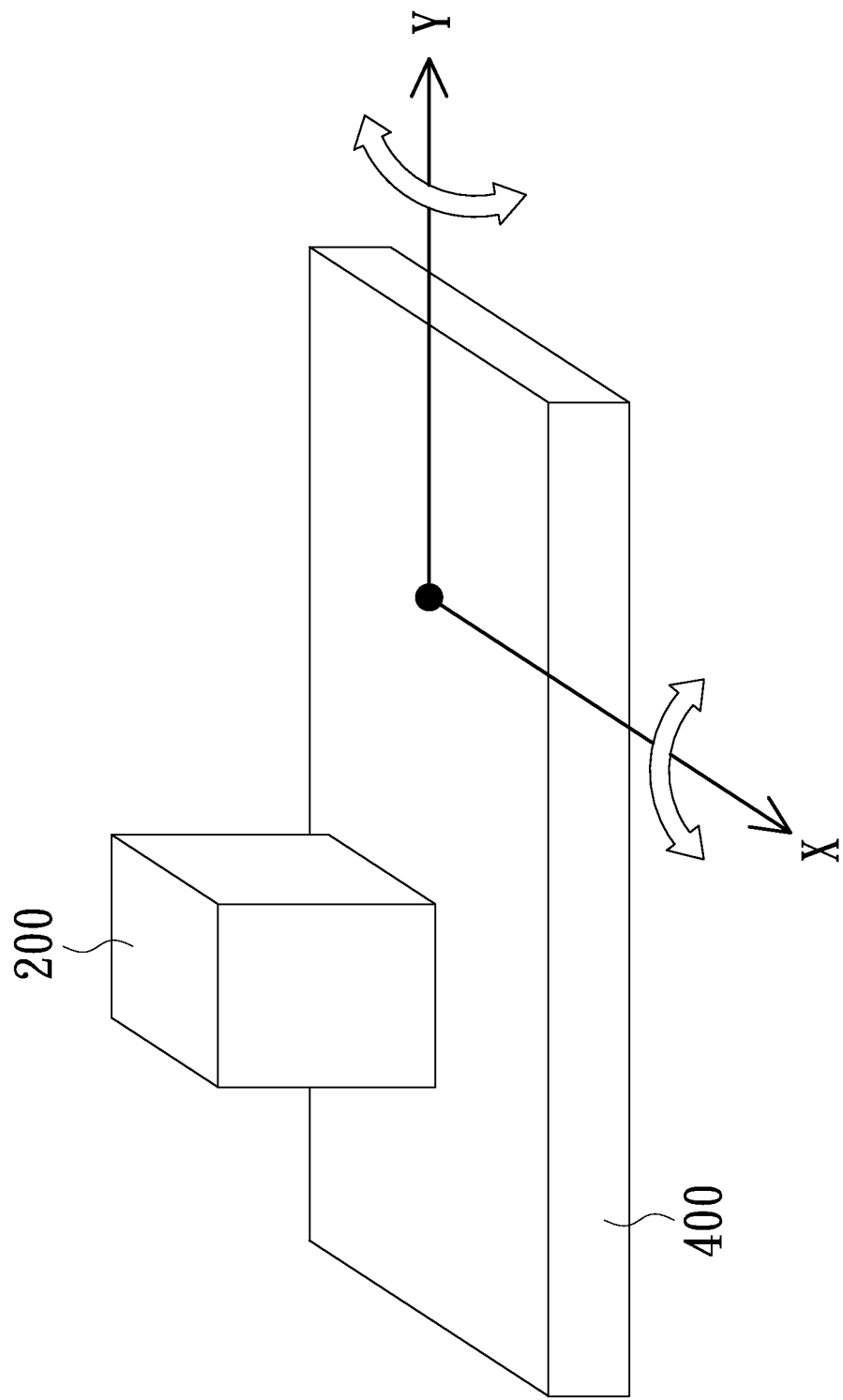

SIMPLE TYPE DUAL AXES OPTOELECTRONIC LEVEL

FIELD OF THE INVENTION

The present invention relates to a level, and more particularly to a dual axes optoelectronic level capable of measuring an inclined angle of a surface of a working desk for horizontal adjustment, pertaining to a field of precision measuring instrument and precision mechanical technology.

BACKGROUND OF THE INVENTION

There are many conventional types of levels, including bubble type and pendulum type. A bubble type level includes a container cup partially filled with liquid. When the bubble type level is put on an inclined surface of a working desk, the liquid will flow to a lower place within the container due to gravity force. An inclined angle of the surface of the working desk can be measured by observing the liquid surface or movement of the bubble in the container. For example, U.S. Pat. No. 7,497,021 discloses a multi-axis bubble vial device, and U.S. Pat. No. 5,313,713 discloses an electronic level with display scale and audible tone scale.

An electrolyte level sensor has a plurality of electrically conductive particles or magnetic particles added in the liquid. An electrically conductive layer or a magnetic layer is coated or attached on an inner surface of the container. The movement of the liquid can be sensed as corresponding electrically conductive or magnetic positions. In this manner, the inclined angle can be obtained. For example, Brooks Automation Company (USA) owns U.S. Pat. No. 6,526,668 disclosing an electronic level and U.S. Pat. No. 4,932,132 disclosing an electronic level apparatus and method. The above mentioned two bubble type levels have single or dual axes inclined angles measuring functions. But they lack sufficient sensitivity, resolution and precision. Therefore, they can only be used as ordinary levels to measure large inclined angles.

The pendulum level works according to a principle that the pendulum is always perpendicular to the horizontal plane of earth. When the pendulum level is put on an inclined surface, the pendulum inside the device will swing a same inclined angle as that of the main body of the level. A non-contact displacement sensor for measuring the relative displacement of the pendulum relative to the sensor is disposed in the main body of the level, thus achieving the purpose of inclination measurement. If the level is installed with a high precision non-contact displacement sensor, such as a capacitive displacement sensor used to perform high sensitive, high resolution and high precision measurement, the level can be used as a high precision level for measuring small inclined angle. However, such a high precision level in market can only perform single axis measurement. Examples of such products include TALYVEL™ produced by Taylor Hobson Company of Britain and LEVELTRONIC™ produced by Wyler Company of Swiss.

The pendulum level can harness the optoelectronic sensing principle. Examples include the electronic level disclosed in U.S. Pat. No. 4,827,624 and the dual-axis optoelectronic level in TW patent M402416. The pendulum level can also harness the differential electrode sensing principle, as illustrated by the electronic level indicator disclosed in U.S. Pat. No. 5,027,522. The above mentioned pendulum levels all have pendulums immersed in liquid which provides damping effect for stopping vibration of the pendulums. Thus, they have more components.

Summarizing the art above, the bubble type level has fewer components but does not have high precision, and the pendulum type level has more components but only a part of them has high precision performance. The art would be advanced by an improved simple type dual axes level with high precision.

SUMMARY OF THE INVENTION

The present invention provides a creative optoelectronic inclined angle sensing device, which is designed according to a principle that a light beam is refracted in a liquid, and capable of precisely measuring inclined angles around two axes. This optoelectronic level does not have a pendulum and has a simple construction and high precision. The used optical refractive principle has never been used before, which is a main feature of the present invention.

The present invention provides a simple type dual axes optoelectronic level, which has advantages of low cost and high precision. The present invention provides a simple type dual axes optoelectronic level, configured for measuring angle variation of an object. The dual axes optoelectronic level includes a carrier, an adjustable fixing mechanism, a level sensing device, a container cup filled with liquid and a reflector. The adjustable fixing mechanism and the container cup filled with liquid are respectively fixed on the carrier. The level sensing device is fixed on the adjustable fixing mechanism and faces the container cup. The reflector is fixed on a bottom face of the container cup. The level sensing device is configured for providing a measuring light beam. The measuring light beam is incident into a surface of the liquid. A refracted light beam is transmitted to a surface of the reflector. A reflected light beam is refracted by the surface of the liquid and transmitted back to the level sensing device. By the refracted effect of the light beam, the level sensing device is able to sense two angles between the ground and the surface of the liquid along two axes. The dual axes optoelectronic level has advantages of simple construction, low cost, and capability of distinguishing the two inclined angles of the two axes.

According to an embodiment of the present invention, the above mentioned reflector is fixed at a center position of the bottom surface of the container cup.

According to an embodiment of the present invention, the above mentioned container cup is fixed on a bottom portion of the carrier.

According to an embodiment of the present invention, the above mentioned carrier is a shell. The adjustable fixing mechanism, the level sensing device and the container cup are disposed in the shell. The shell has a top wall and a bottom wall opposite to each other. The adjustable fixing mechanism is fixed on the top wall and the container cup is fixed on the bottom wall.

According to an embodiment of the present invention, the above mentioned level sensing device includes a light source, a light sensor and an optical component set. The light source is configured for providing the measuring light beam, and the light sensor is configured for sensing the measuring light beam. The optical component set is disposed between the light source and the light sensor, the optical component set is configured for guiding the measuring light beam provided by the light source to a reflective surface of the reflector, and guiding the measuring light beam reflected by the reflective surface to the light sensor.

According to an embodiment of the present invention, the above mentioned light source includes a laser light source.

According to an embodiment of the present invention, the above mentioned light sensor includes a four-quadrant light sensor.

According to an embodiment of the present invention, the above mentioned adjustable fixing mechanism is fixed on a wall surface of the carrier and has a first hinge and a second hinge perpendicular to each other, and the first hinge and the second hinge are perpendicular to a normal vector of the wall surface.

According to an embodiment of the present invention, the above mentioned adjustable fixing mechanism includes a first plate, a second plate disposed above the first plate, and a third plate disposed above the second plate. The second plate has a first side edge and a second side edge adjacent to each other. The first side edge is connected with a side edge of the first plate, and the first hinge is formed as a joint between the first plate and the second plate. The second side edge is connected with a side edge of the third plate, and the second hinge is formed as a joint between the second plate and the third plate.

According to an embodiment of the present invention, the above mentioned second plate has a first through hole, a first screw hole and a second screw hole. The first through hole is disposed at a third side edge of the second plate opposite to the first side edge. The first screw hole is disposed adjacent to the first through hole. The second screw hole is disposed adjacent to a fourth side edge of the second plate opposite to the second side edge. The first plate has a third screw hole corresponding to the first through hole. The third plate has a second through hole corresponding to the first through hole, a third through hole corresponding to the first screw hole, a fourth through hole corresponding to the second screw hole and a fourth screw hole adjacent to the fourth through hole. The first plate, the second plate and the third plate further respectively have a fifth screw hole, a sixth screw hole and a seventh screw hole corresponding to each other. The adjustable fixing mechanism further has a first fastener, a second fastener, a third fastener, a fourth fastener and a fifth fastener. The first fastener passes through the fifth screw hole, the sixth screw hole and the seventh fastener, and fixed to the carrier. The second fastener passes through the second through hole, the first through hole and fixed to the third screw hole. The third fastener passes through the third through hole and fixed to the first screw hole. The third fastener is configured for passing through the first screw hole and bearing against the first plate. The fourth fastener passes through the fourth through hole and fixed to the second screw hole. The fifth fastener is fixed to the fourth screw hole and configured for passing through the fourth screw hole and bearing against the second plate.

According to an embodiment of the present invention, the above mentioned simple type dual axes optoelectronic level further includes a container cup cover fixed on the container cup for covering a first opening on a top portion of the container cup. The container cup cover has a second opening and a tubular portion protruding from the second opening and toward a bottom portion of the container cup.

In another aspect, a two-axis optoelectronic level comprises a container cup, a light source, a reflector, and a light sensor. The container cup holds a liquid. The reflector is positioned at a bottom end of the container cup and is immersed in the liquid. A light sensor is positioned opposite the reflector, above the liquid and in air, and is configured to receive light emanating from the light source, reflected by the reflector and refracted by the liquid. The light sensor enables a determination of a sensor-striking angle $\theta_3$ at which light strikes the light sensor from a direction normal to the sensor. An inclination angle $\theta_0$ at which the level is inclined is defined by the relationship:

$$\theta_0 = \theta_3 - \theta = \frac{n_1 \theta}{2(n_2 - n_1)};$$

wherein $\theta_0$ is the inclination angle; $\theta_3$ is the sensor striking angle; and $n_1$ and $n_2$ are refractive indices, respectively, of the air and the liquid.

In comparison to conventional bubble type level and pendulum type level, the simple type dual axes optoelectronic level of the present invention uses simple optical refractive phenomena in cooperation with the level sensing device and the reflector to achieve the purpose of small angle measurement and have advantages of low cost and small size. In addition, the simple type dual axes optoelectronic level not only can be disposed on an object for a long time and achieving the purpose of real time monitoring, but can measure variations of pitch angle and roll angle of the working desk.

BRIEF DESCRIPTION OF THE DRAWINGS

The present invention will become more readily apparent to those ordinarily skilled in the art after reviewing the following detailed description and accompanying drawings, in which:

FIG. 6 is a schematic view of the simple type dual axes optoelectronic level showing the dual axes optoelectronic level measuring angle variation of the object.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
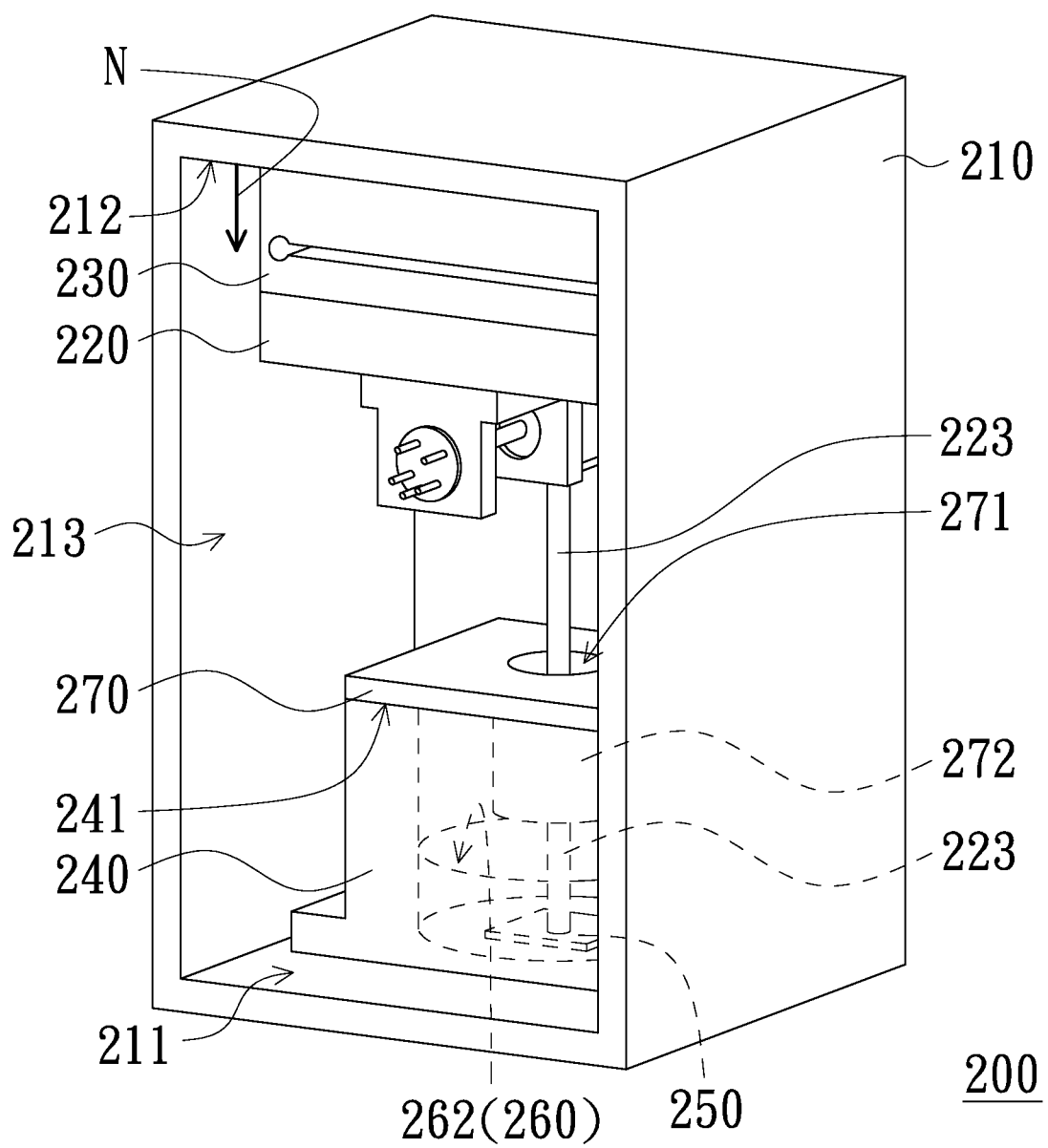
FIG. 1 is a schematic perspective view of a simple type dual axes optoelectronic level according to an embodiment of the present invention.

FIG. 1 is a schematic perspective view of a simple type dual axes optoelectronic level according to an embodiment of the present invention. Referring to FIG. 1, the dual axes optoelectronic level 200 includes a carrier 210, an adjustable fixing mechanism 230, a level sensing device 220, a container cup filled with liquid 240, a reflector 250 and liquid 260 with damping property.

The above carrier 210 is, for example, a shell including a bottom wall 211 and a top wall 212 opposite to the bottom wall 211. The adjustable fixing mechanism 230 and the level sensing device 220 are fixed inside the carrier 210. The adjustable fixing mechanism 230 is, for example, fixed on the top wall 212 of the carrier 210. The level sensing device 220 is, for example, fixed a bottom portion of the adjustable fixed mechanism 230. The adjustable fixing mechanism can be any dual-angle adjustable mechanism configured for fine tuning the angle of the measuring light beam 223 emitted from the level sensing device 220. The structure of the adjustable fixing mechanism of this embodiment can be detailed below. Besides, the carrier 210 in FIG. 1 has an opening 213 for illustrating components therein, however, in practical use the opening 213 can be covered by a wall.

The container cup 240 filled with liquid 260 is, for example, fixed on the bottom wall 211 of the carrier 210. The container cup 240 is partially filled with the liquid 260. The simple type dual axes optoelectronic level 200 further includes a container cup cover 270 fixed onto the container cup 240 for covering a first opening 241 on a top portion of the container cup 240. The container cup cover 270 has a second opening 271 and a tubular portion 272 protruding from the second opening 271 and extending toward a bottom portion of the container cup 240. The tubular portion 272 is, for example, barrel shaped, but not limited thereto. The tubular portion 272 is used to prevent the liquid 260 from overflowing while the level 200 is tilted. The surface of liquid 260 cannot exceed a maximum height that allows the liquid 260 to flow into the tubular portion 272 while the optoelectronic level 200 is tilted. The reflector 250 is fixed on a bottom surface of the container cup 240. In this embodiment, the reflector 250 is fixed at a center position of the bottom surface of the container cup 240. The measuring light beam 223 emitted from the level sensing device 220 passes through the tubular portion 272 and transmits to the liquid surface 262 of the liquid 260. The reflector 250 is configured for reflecting the light beam 223 after the light beam 223 passes through the liquid surface 262.

Figure 2:
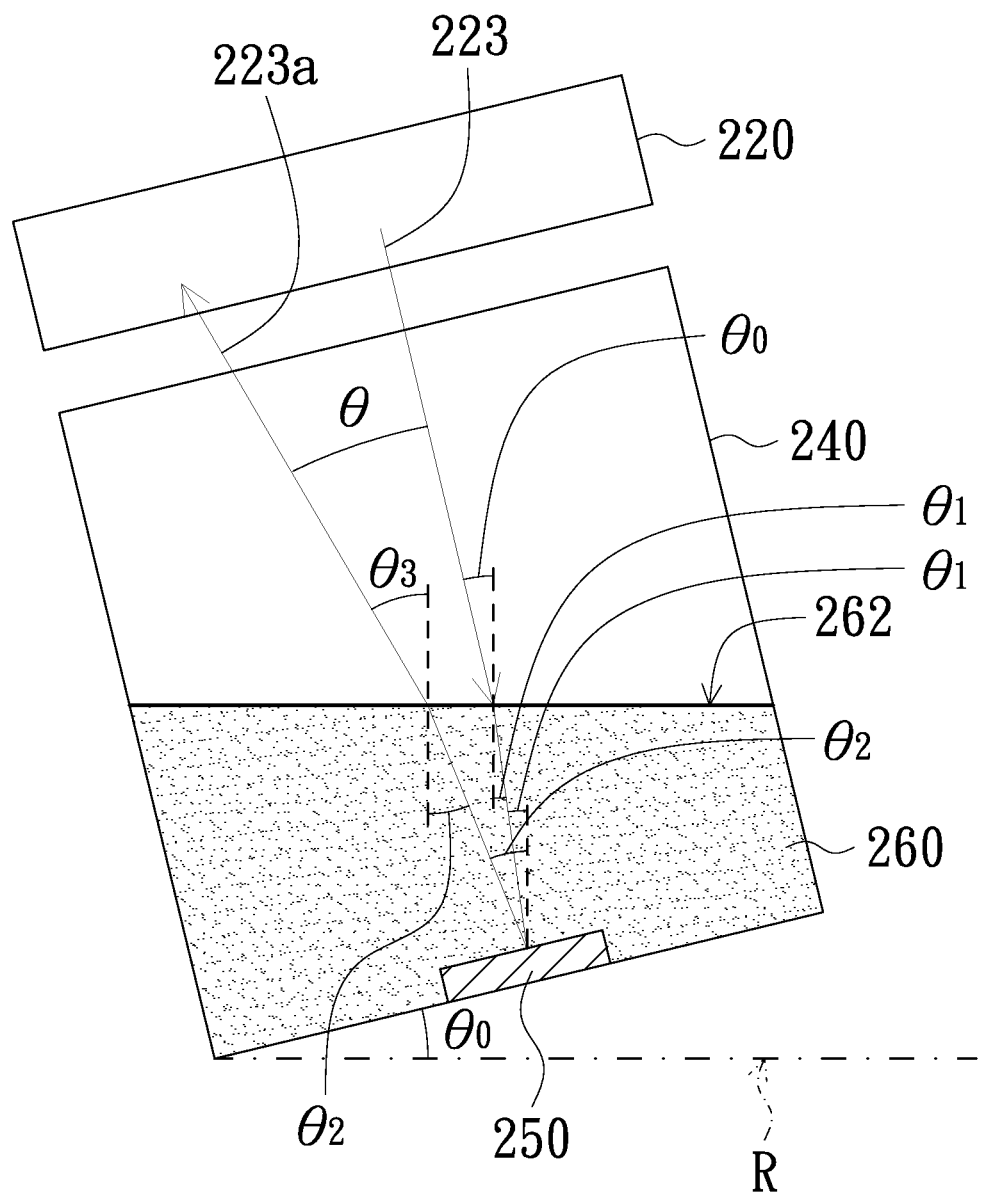
FIG. 2 is a schematic view showing that the light beam of the simple type optoelectronic level passes through the horizontal liquid surface and is refracted and reflected back from the reflector.

FIG. 2 is a schematic view showing that the light beam of the simple type optoelectronic level passes through the horizontal liquid surface and is refracted and reflected back from the reflector. Referring to FIG. 2, the simple type optoelectronic level 200 is tilted with respect to a reference horizontal plane R, and an inclined angle $\theta_0$ is formed therebetween. When the measuring light beam 223 emitted from the level sensing device 220 reaches the liquid surface 262, the incident angle of the measuring light beam 223 is the same as the inclined angle $\theta_0$. The refracted angle $\theta_1$ is formed when the measuring light beam 223 is emitted from air with refractive index n1 and incident to the liquid 260 with refractive index n2. According to Snell's law, an equation can be obtained: $n_1 \sin \theta_0 = n_2 \sin \theta_1$ (hereinafter called equation 1). Then, the measuring light beam 223 will be totally reflected by the reflector 250. The totally reflected measuring light beam 223 is transmitted back to the liquid surface 262 with a reflected angle $\theta_2$. The reflected angle $\theta_2$ satisfies an equation: $\theta_2 = 2\theta_0 - \theta_1$ (hereinafter called equation 2). Then, the measuring light beam 223 is emitted away from the liquid surface 262 after the second refraction. The measuring light beam 223 emitted away from the liquid surface 262 is marked as reference numeral 223a. The refracted angle $\theta_3$ satisfies an equation:

$$\theta_3 = \sin^{-1}\left(\frac{n_2 \sin \theta_2}{n_1}\right)$$

(hereinafter called equation 3). The measuring light beam 223a emitted away from the liquid surface 262 will be transmitted back to the level sensing device 220. Thus, an angle $\theta$ is formed between the measuring light beam 223 emitted from the level sensing device 220 and the measuring light beam 223a transmitted back to the level sensing device 220. The angle $\theta$ has a geometric relation with the inclined angle $\theta_0$ (as shown in FIG. 2) of the bottom surface 211 (shown in FIG. 1) of the carrier 210. More specifically, a geometric relation derived from the above mentioned equations 1-3 can be expressed as:

$$\theta_0 = \theta_3 - \theta = \frac{n_1 \theta}{2(n_2 - n_1)}$$

Thus, the practical angle $\theta_0$ can be derived therefrom when the angle $\theta$ is measured.

Figure 3:
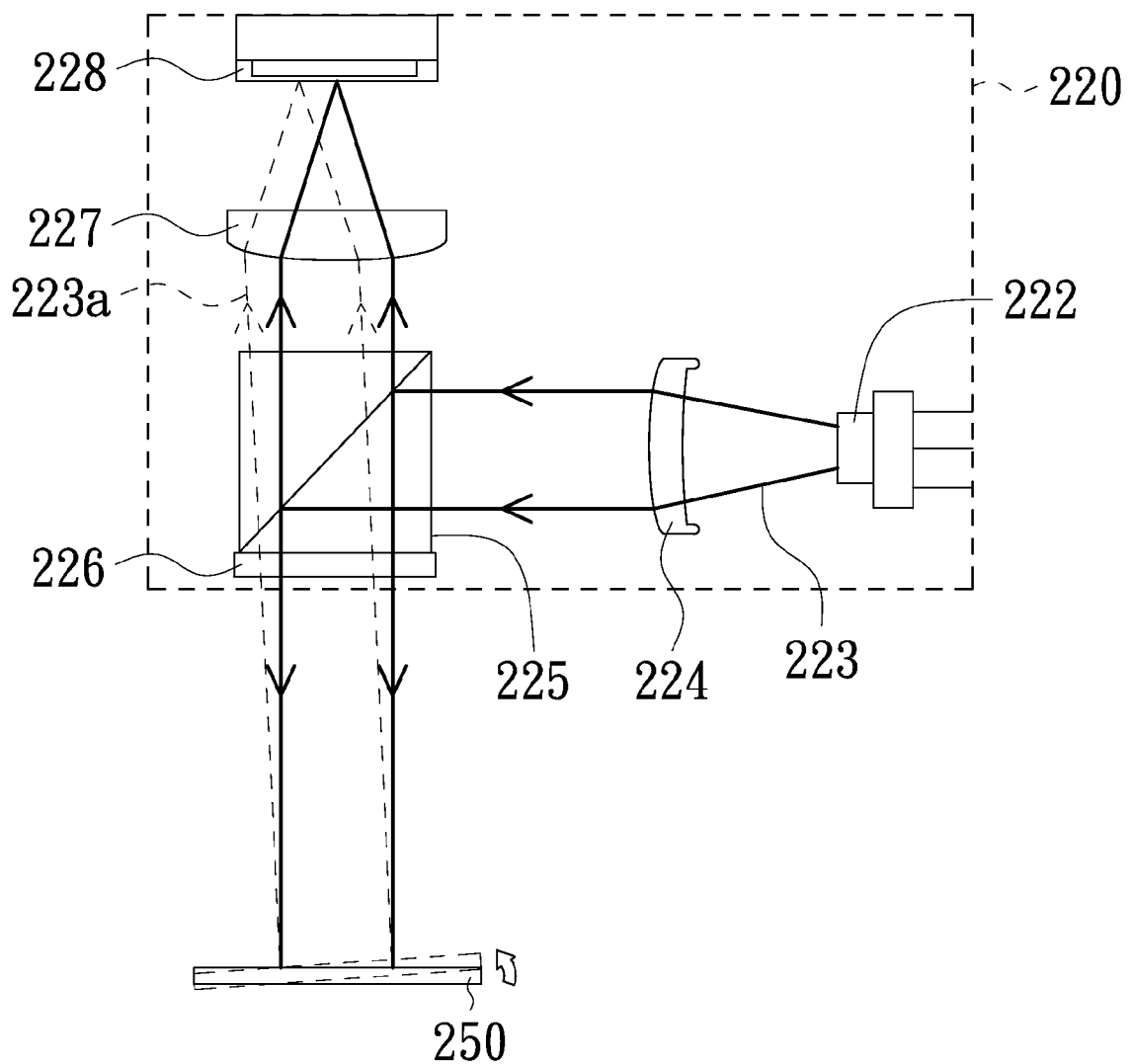
FIG. 3 is a schematic view showing a level sensing device of the simple type optoelectronic level sensing an inclined angle.

FIG. 3 is a schematic view showing a level sensing device of the simple type optoelectronic level is sensing an inclined angle. Referring to FIG. 3, the level sensing device 220, for example, includes a light source 222, a light sensor 228, a collimating lens 224, a polarization beam splitter 225, a quarter-wave plate 226 and a focusing lens 227. The light source 222 is used for providing the measuring light beam 223. The collimating lens 224 is used for converting the divergent measuring light beam 223 into a parallel light beam. The polarization beam splitter 225 is used for guiding the measuring light beam 223 to the reflector 250. The measuring light beam 223a reflected by the reflector 250 will be transmitted to the polarization beam splitter 225. Since the quarter-wave plate 226 is disposed between the polarization beam splitter 225 and the reflector 250, the measuring light beam 223a reflected by the reflector 250 will be guided to the light sensor 228. The light sensor 228 is used for sensing the measuring light beam 223a reflected by the reflector 250. The light source 222 can be a laser diode or other laser source, but not limited thereto. The light sensor 228 can be a dual-axis light spot position sensor such as a four-quadrant light sensor. The measuring light beam 223a is represented by a dashed line. When the measuring light beam 223a reflected by the reflector 250 is inclined with respect to the original measuring light beam 223, the projecting position of the measuring light beam 223a reflected from the reflector 250 is changed, and causes variation of output voltage of the optical sensor 228. By capturing the output voltage of the optical sensor 228, the angle between the measuring light beam 223 emitted from the level sensing device 220 and the measuring light beam 223a transmitted back to the level sensing device 220 can be obtained.

Figure 4:
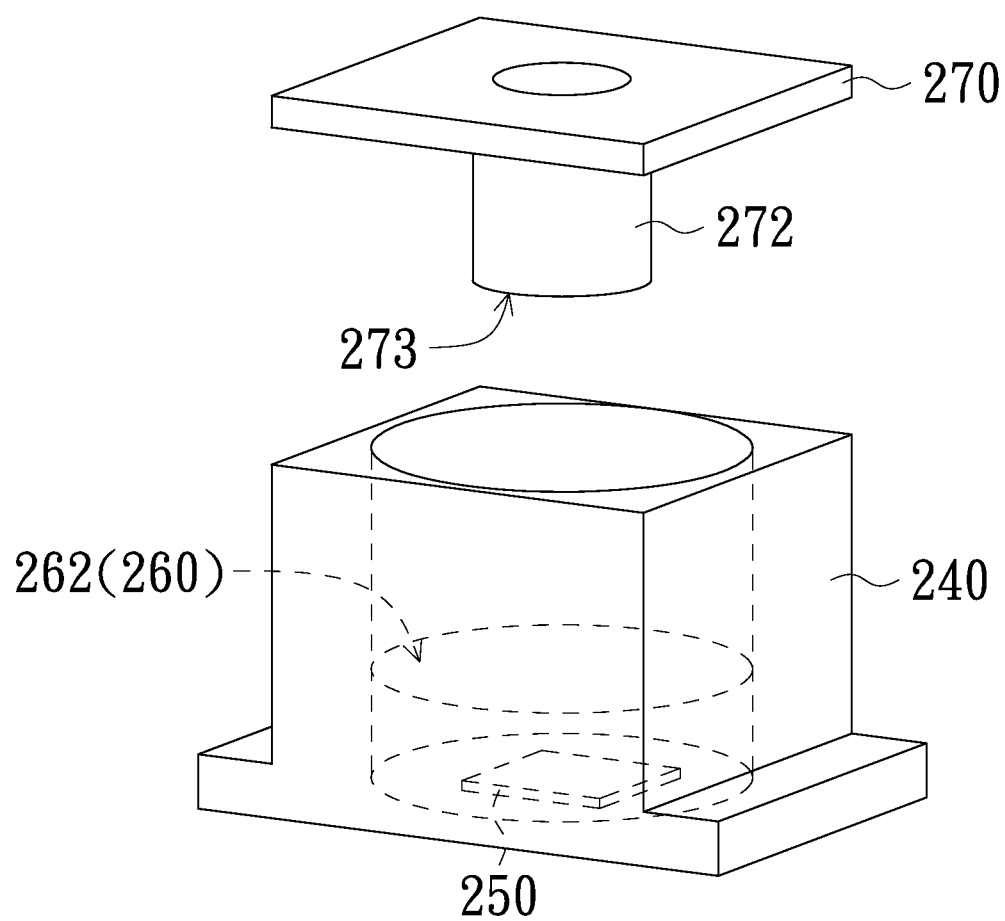
FIG. 4 is a schematic perspective view showing the simple type dual axes optoelectronic level in FIG. 1, including the container cup cover, the reflector, and the container cup filled with liquid.
Figure 5A:
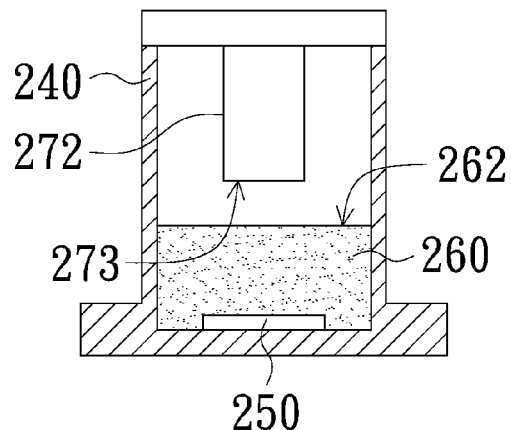
FIG. 5A to FIG. 5E are schematic views of the components in FIG. 4 assembled, showing the variations of the liquid in different orientations of the container cup.
Figure 5B:
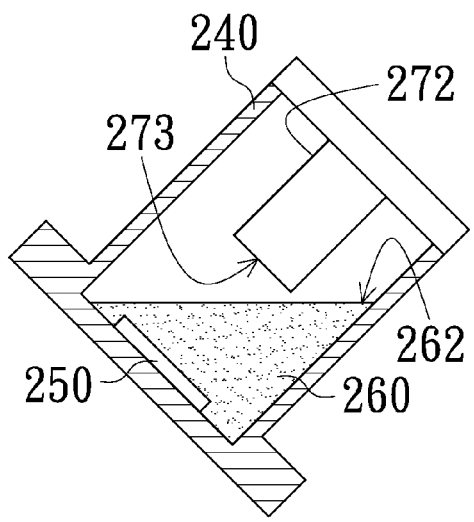
Figure 5C:
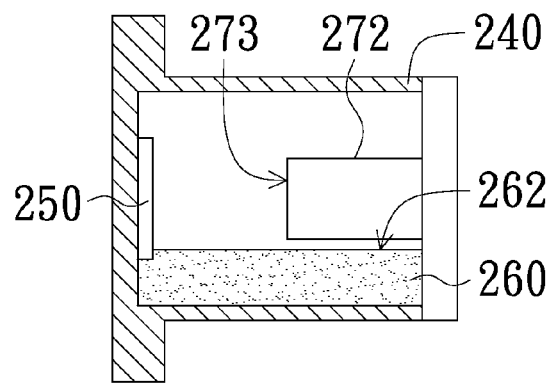
Figure 5D:
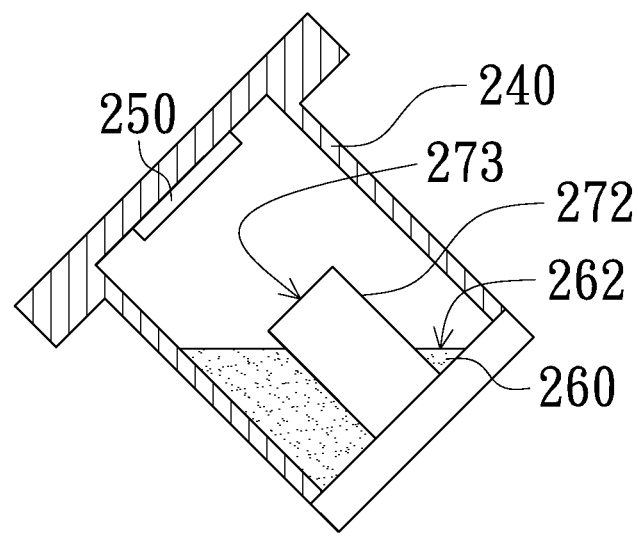
Figure 5E:
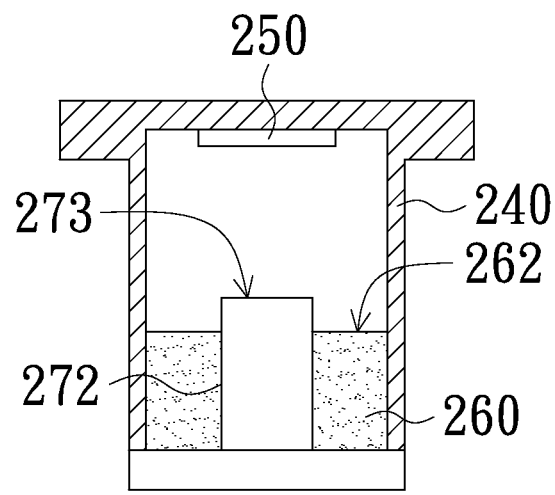

FIG. 4 is a schematic perspective view showing the simple type dual axes optoelectronic level in FIG. 1, which includes the container cup cover, the reflector, and the container cup filled with liquid. FIG. 5A to FIG. 5E are schematic views of the components in FIG. 4 assembled, showing the variations of the liquid in different orientations of the container cup. Referring to FIG. 4 and FIG. 5A, the container cup cover 270 has a tubular portion 272 protruding toward the bottom portion of the container cup 240. When the container cup 240 is horizontally positioned (as shown in FIG. 5A), a bottom end 273 of the tubular portion 272 is higher than the liquid surface 262. The arrangement of the tubular portion 272 keeps the liquid 260 in the container cup 240 from overflowing the container cup 240 while the simple type dual axes optoelectronic level 200 is in any of the positions from FIG. 5B to FIG. 5E. This is a particular design which makes the simple type dual axes optoelectronic level 200 easier to carry. An example is detailed below for demonstrating the simple type dual axes optoelectronic level 200 of the present embodiment measuring an inclined angle of an inclined surface.

FIG. 6 is a schematic view of the simple type dual axes optoelectronic level 200 being used to measure angular orientations, in two axes, of an object 400. The object 400 can be a moving table of an online optical inspection equipment, a moving table of a machine tool, or a moving table of an optical projecting machine, but is not limited thereto. To use the simple type dual axes optoelectronic level 200 to measure the angular orientation of the object 400, the simple type dual axes optoelectronic level 200 can be fixed onto the object 400 in advance. When the object 400 is moved, the angle variation will cause variation of the output voltage of the light sensor. Thus, the angle variation of the object 400 out of any horizontal direction can be monitored. In other words, the pitch angle and roll angle (rotation angles respectively around X-axis and Y-axis) of the object 400 during the transporting process can be measured.

Figure 7:
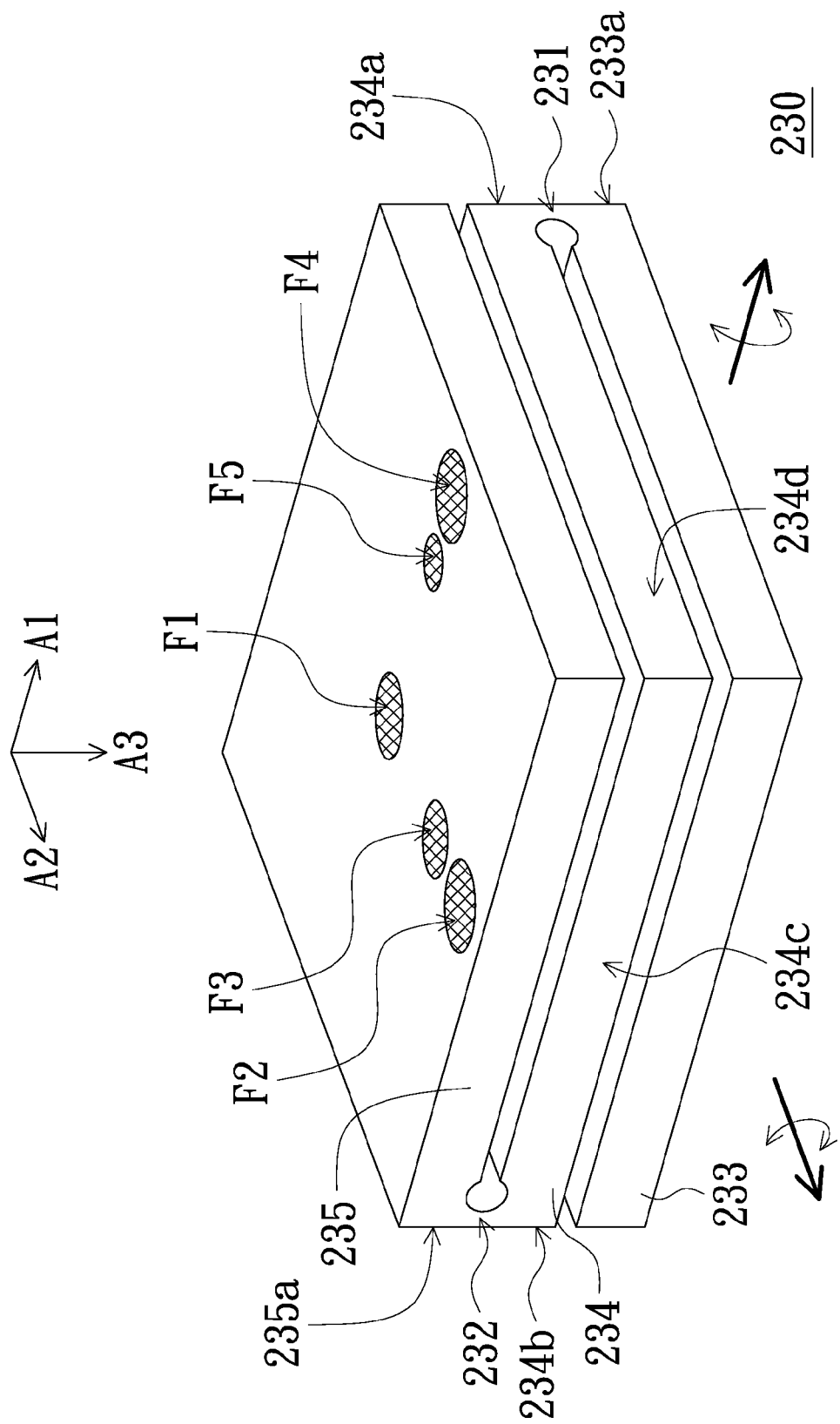
FIG. 7 is a schematic perspective view of the adjustable fixing mechanism in FIG. 1.
Figure 8A:
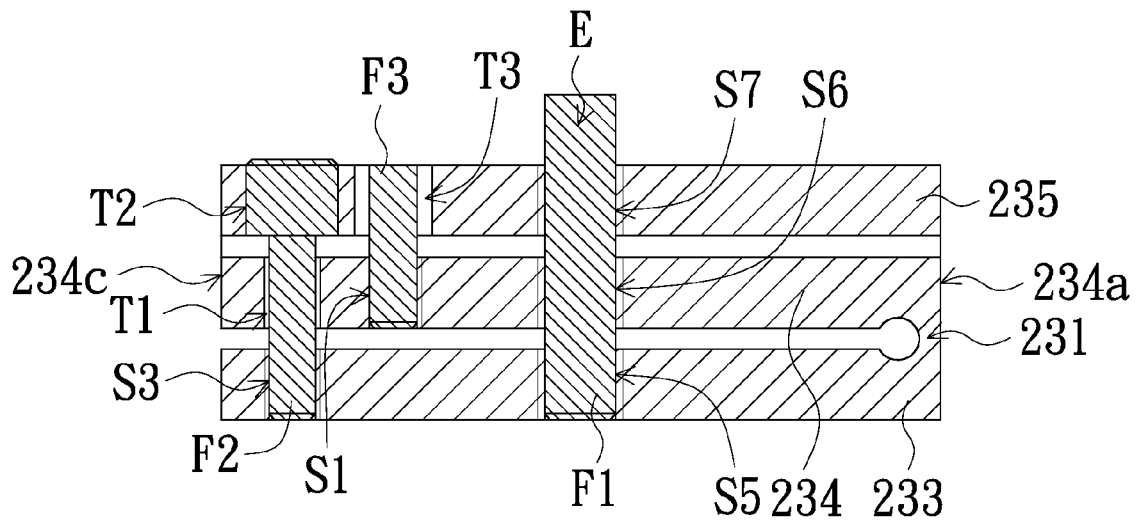
FIG. 8A is a sectional schematic view of FIG. 7 along the direction A1.
Figure 8B:
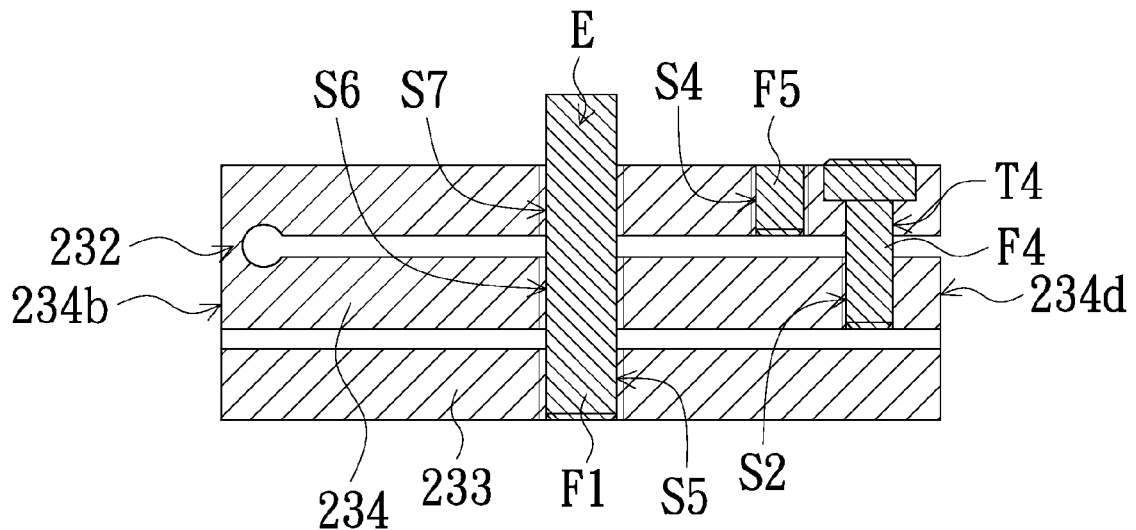
FIG. 8B is a sectional schematic view of FIG. 7 along the direction A2.

FIG. 7 is a schematic perspective view of the adjustable fixing mechanism 230 of FIG. 1. FIG. 8A is a sectional schematic view of FIG. 7 along the direction A1. FIG. 8B is a sectional schematic view of FIG. 7 along the direction A2. Referring to FIG. 1 and FIG. 7, the adjustable fixing mechanism 230 is, for example, fixed onto a wall surface of the top wall 212 of the carrier 210, and has a first hinge 231 and a second hinge 232 mutually perpendicular to each other. The first hinge 231 is parallel to the direction A2. The second hinge 232 is parallel to the direction A1. The first hinge 231 and the second hinge 232 are perpendicular to a normal vector N of the wall surface of the top wall 212. The normal vector N is parallel to direction A3. The adjustable fixing mechanism 230 can be fine tuned around the first hinge 231 and the second hinge 232 to adjust the angles of the two axes.

The above mentioned adjustable fixing mechanism 230 includes a first plate 233, a second plate 234 disposed above the first plate 233, and a third plate 235 disposed above the second plate 234. The second plate 234 has a first side edge 234a and a second side edge 234b adjacent to each other. The first side edge 234a is connected with a side edge 233a of the first plate 233, and the first hinge 231 is formed as a joint between the first plate 233 and the second plate 234. The second side edge 234b is connected with a side edge 235a of the third plate 235, and the second hinge 232 is formed as a joint between the second plate 234 and the third plate 235.

Referring to FIG. 7, FIG. 8A and FIG. 8B, the second plate 234 has a first through hole T1, a first screw hole S1 and a second screw hole S2. The first through hole T1 is disposed at a third side edge 234c of the second plate 234 opposite to the first side edge 234a. The first screw hole S1 is disposed adjacent to the first through hole T1. The second screw hole S2 is disposed adjacent to a fourth side edge 234d of the second plate 234 opposite to the second side edge 234b. The first plate 233 has a third screw hole S3 corresponding to the first through hole T1. The third plate 235 has a second through hole T2 corresponding to the first through hole T1, a third through hole T3 corresponding to the first screw hole S1, a fourth through hole T4 corresponding to the second screw hole S2 and a fourth screw hole S4 adjacent to the fourth through hole T4. The first plate 233, the second plate 234, the third plate 235 further respectively have a fifth screw hole S5, a sixth screw hole S6 and a seventh screw hole S7 corresponding to each other. The adjustable fixing mechanism 230 further has a first fastener F1, a second fastener F2, a third fastener F3, a fourth fastener F4 and a fifth fastener F5. The first fastener F1 passes through the fifth screw hole S5, the sixth screw hole S6 and the seventh fastener S7. An end portion E of the first fastener F1 protrudes out from the seventh screw hole S7. The end portion E is fixed onto the top wall 212 of the carrier 210 in FIG. 1, in order to fix the adjustable fixing mechanism 230 to the top wall 212 of the carrier 210.

The second fastener F2 passes through the second through hole T2, the first through hole T1 and is affixed to the third screw hole S3. The third fastener F3 passes through the third through hole T3 and is affixed to the first screw hole S1. The third fastener F3 is configured for passing through the first screw hole S1 and bearing against the first plate 233. By rotating the second fastener F2 and the third fastener F3, the adjustable fixing mechanism 230 is rotated clockwise or counterclockwise around the first hinge 231 to fine tune the angles. In addition, the fourth fastener F4 passes through the fourth through hole T4 and is affixed to the second screw hole S2. The fifth fastener F5 is affixed to the fourth screw hole S4 and configured for passing through the fourth screw hole S4 and bearing against the second plate 234. By rotating the fourth fastener F4 and fifth fastener F5, the adjustable fixing mechanism 230 is rotated clockwise or counterclockwise around the second hinge 232 to fine tune the angles.

It should be mentioned that the adjustable fixing mechanism can adopt any adjustment mechanism for adjusting the two angles. The invention is not limited to the adjustable fixing mechanism 230.

In contrast to conventional bubble type levels and pendulum levels, the simple type dual axes optoelectronic level harnesses the principle of optical refraction in cooperation with a level sensing device and reflector to measure angles in a low cost and small size package. The simple type dual axes optoelectronic level can not only be disposed on an object for a long time and achieve the purpose of real time monitoring, but also measure variations of pitch angle and roll angle of the working desk (object).

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A simple type dual axes optoelectronic level, comprising:
    a carrier;
    an adjustable fixing mechanism fixed on the carrier;
    a level sensing device fixed on the adjustable fixing mechanism, the level sensing device being configured for providing a measuring light beam;
    a container cup fixed on the carrier and facing the level sensing device, the container cup being filled with a liquid;
    a reflector fixed on a bottom face of the container cup and facing the level sensing device and immersed in the liquid, wherein the measuring light beam is incident to the reflector and the reflector is configured for reflecting the measuring light beam back to the level sensing device; and a container cup cover fixed on the container cup for covering a first opening of a top portion of the container cup, wherein the container cup cover has a second opening and a tubular portion protruding from the second opening and toward a bottom portion of the container cup.

2. The simple type dual axes optoelectronic level as claim 1, wherein the adjustable fixing mechanism is fixed on a wall surface of the carrier, and has a first hinge and a second hinge perpendicular to each other, and the first hinge and the second hinge are perpendicular to a normal vector of the wall surface.

3. The simple type dual axes optoelectronic level as claim 1, wherein the adjustable fixing mechanism comprises a first plate, a second plate disposed above the first plate, and a third plate disposed above the second plate, the second plate has a first side edge and a second side edge adjacent to each other, the first side edge is connected with a side edge of the first plate, and the first hinge is formed as a joint between the first plate and the second plate, the second side edge is connected with a side edge of the third plate, and the second hinge is formed as a joint between the second plate and the third plate.

4. The simple type dual axes optoelectronic level as claim 3, wherein the second plate has a first through hole, a first screw hole and a second screw hole, the first through hole is disposed at a third side edge of the second plate opposite to the first side edge, the first screw hole is disposed adjacent to the first through hole, the second screw hole is disposed adjacent to a fourth side edge of the second plate opposite to the second side edge, the first plate has a third screw hole corresponding to the first through hole, the third plate has a second through hole corresponding to the first through hole, a third through hole corresponding to the first screw hole, a fourth through hole corresponding to the second screw hole and a fourth screw hole adjacent to the fourth through hole, and the first plate, the second plate, the third plate further respectively have a fifth screw hole, a sixth screw hole and a seventh screw hole corresponding to each other, the adjustable fixing mechanism further includes:
  a first fastener passing through the fifth screw hole, the sixth screw hole and the seventh fastener, and fixed to the carrier;
  a second fastener passing through the second through hole, the first through hole and fixed to the third screw hole;
  a third fastener passing through the third through hole and fixed to the first screw hole, the third fastener is configured for passing through the first screw hole and bearing against the first plate,
  a fourth fastener passing through the fourth through hole and fixed to the second screw hole; and
  a fifth fastener fixed to the fourth screw hole and configured for passing through the fourth screw hole and bearing against the second plate.

5. The simple type dual axes optoelectronic level as claim 1, wherein the level sensing device comprises:

a light source configured for providing the measuring light beam;
a light sensor configured for sensing the measuring light beam;
an optical component set disposed between the light source and the light sensor, wherein the optical component set is configured for guiding the measuring light beam provided by the light source to the reflective surface of the reflector, and guiding the measuring light beam reflected by the reflective surface to the light sensor.

6. The simple type dual axes optoelectronic level as claim 5, wherein the light source includes a laser light source.

7. The simple type dual axes optoelectronic level as claim 5, wherein the light sensor includes a dual-axis light spot position sensor.

8. The simple type dual axes optoelectronic level as claim 1, wherein the carrier is a shell, the adjustable fixing mechanism, the level sensing device and the container cup are disposed in the shell, the shell has a top wall and a bottom wall opposite to each other, the adjustable fixing mechanism is fixed on the top wall and the container cup is fixed on the bottom wall.

9. A two-axis optoelectronic level comprising:
a container cup holding a liquid;
a light source;
a reflector positioned at a bottom end of the container cup, the reflector immersed in the liquid;
a light sensor positioned opposite the reflector, above the liquid and in air, and configured to receive light emanating from the light source, reflected by the reflector and refracted by the liquid;
wherein the light sensor enables a determination of a sensor-striking angle 83 at which light strikes the light sensor from a direction normal to the sensor, and wherein an inclination angle 80 at which the level is inclined is defined by the relationship:

$$\theta_0 = \theta_3 - \theta = \frac{n_1 \theta}{2(n_2 - n_1)};$$

wherein θ0 is the inclination angle;
θ3 is the sensor striking angle;
n1 and n2 are refractive indices, respectively, of the air and the liquid; and
a container cup cover fixed on the container cup for covering a first opening of a top portion of the container cup, wherein the container cup cover has a second opening and a tubular portion protruding from the second opening and toward a bottom portion of the container cup.

* * * * *